United States Patent
Tanno

(10) Patent No.: US 12,132,235 B2
(45) Date of Patent: Oct. 29, 2024

(54) FUEL CELL SEPARATOR

(71) Applicant: Nisshinbo Holdings Inc., Tokyo (JP)

(72) Inventor: Fumio Tanno, Chiba (JP)

(73) Assignee: NISSHINBO HOLDINGS INC., Tokyo (JP)

(*) Notice: Subject to any disclaimer, the term of this patent is extended or adjusted under 35 U.S.C. 154(b) by 342 days.

(21) Appl. No.: 17/429,410

(22) PCT Filed: Jan. 28, 2020

(86) PCT No.: PCT/JP2020/002971
§ 371 (c)(1),
(2) Date: Aug. 9, 2021

(87) PCT Pub. No.: WO2020/170733
PCT Pub. Date: Aug. 27, 2020

(65) Prior Publication Data
US 2022/0140357 A1    May 5, 2022

(30) Foreign Application Priority Data

Feb. 21, 2019   (JP) ................. 2019-029744

(51) Int. Cl.
| H01M 8/026 | (2016.01) |
| H01M 8/0213 | (2016.01) |
| H01M 8/0221 | (2016.01) |
| H01M 8/0226 | (2016.01) |

(52) U.S. Cl.
CPC ......... *H01M 8/026* (2013.01); *H01M 8/0213* (2013.01); *H01M 8/0221* (2013.01); *H01M 8/0226* (2013.01)

(58) Field of Classification Search
CPC .. H01M 8/026; H01M 8/0213; H01M 8/0221; H01M 8/0226
See application file for complete search history.

(56) References Cited

U.S. PATENT DOCUMENTS

| 2005/0130022 A1 | 6/2005 | Tanno et al. |
| 2008/0050618 A1 | 2/2008 | Tanno et al. |
| 2013/0171547 A1* | 7/2013 | Tanno ................. H01M 8/0221 429/509 |
| 2018/0205093 A1 | 7/2018 | Tanno |

FOREIGN PATENT DOCUMENTS

| JP | 2005-197222 A | 7/2005 |
| JP | 2005-302621 A | 10/2005 |
| JP | 2008-53052 A | 3/2008 |
| JP | 2010-92638 A | 4/2010 |
| JP | 2013-222521 A | 10/2013 |
| JP | 2014-154475 A | 8/2014 |
| JP | 2015-038840 A | 2/2015 |
| JP | 2015-222729 A | 12/2015 |
| JP | 2016-85806 A | 5/2016 |
| JP | 2017027761 A * | 2/2017 ........... B29C 43/006 |
| WO | 2017/013994 A1 | 1/2017 |

OTHER PUBLICATIONS

JP2015222729A—Machine Translation (Year: 2015).*
JP2017027761A—Machine Translation (Year: 2017).*
International Search Report dated Apr. 14, 2020, issued in counterpart International Application No. PCT/JP2020/002971 (2 pages).
Extended (Supplementary) European Search Report dated Nov. 25, 2022, issued in counterpart EP Application No. 20759306.2. (7 pages).

* cited by examiner

*Primary Examiner* — Miriam Stagg
*Assistant Examiner* — Patrick Marshall Greene
(74) *Attorney, Agent, or Firm* — WHDA, LLP

(57) ABSTRACT

A fuel cell separator which is obtained by molding a composition that contains a carbonaceous material and a resin, and which is provided with a sealing part and a groove that serves as a gas flow channel on one surface or both surfaces. This fuel cell separator is configured such that the arithmetic mean heights Sa of the surface of the sealing part and the bottom surface and the peak of the groove on at least one surface are 0.50-1.60 μm and the profile peak heights Spk thereof are 1.50 μm or less as determined in accordance with ISO 25178-2 (2012). Consequently, this fuel cell separator has good hydrophilicity and good adhesion to a gasket.

5 Claims, No Drawings

FUEL CELL SEPARATOR

TECHNICAL FIELD

The present invention relates to a fuel cell separator.

BACKGROUND ART

One role of the fuel cell separator is to confer each unit cell with electrical is conductivity. In addition, separators provide flow channels for the supply of fuel and air (oxygen) to the unit cells and also serve as boundary walls separating the unit cells.

Properties required of a separator thus include high electrical conductivity, high impermeability to gases, chemical stability, heat resistance and hydrophilicity.

Such separators are sometimes subjected to blasting treatment in order to remove the skin layer and adjust the surface roughness, and hydrophilic treatment in order to enhance the hydrophilicity. Also, where necessary, a gasket for sealing is sometimes laminated onto the peripheral edge of the separator.

For example. Patent Document 1 discloses that a fuel cell separator in which the surface of a body molded from a composition containing a thermoset resin, synthetic graphite and an internal mold release agent has been subjected to roughening treatment by shot blasting, thereby adjusting the average roughness Ra of the surface to from 1.0 to 5.0 μm, has a good hydrophilicity and can easily remove water produced as a result of power generation by the fuel cell, enabling contact resistance with the electrodes to be reduced.

However, in the fuel cell separator of Patent Document 1, a surface roughness Ra of at least 1.5 μm is required in order to set the wetting tension to 56 mN/m or more, and so masking has been necessary during surface roughening treatment.

Patent Document 2 teaches that a fuel cell separator in which the surface of a body molded from a composition containing graphite powder, a thermoset resin and an internal mold release agent has been roughened by blasting treatment using an abrasive grit, thereby adjusting the arithmetic mean roughness Ra of the surface to from 0.27 to 1.20 μm and the maximum height roughness Rz to from 2.0 to 8.0 μm, along with having a good hydrophilicity, also has other advantages, such as good adherence with sealing materials, enabling gas leakage to be minimized.

However, in the fuel cell separator of Patent Document 2, adhesion between a gasket and the separator is inadequate, and so the gasket sometimes delaminates during cell assembly.

PRIOR ART DOCUMENTS

Patent Documents

Patent Document 1: JP-A 2005-197222
Patent Document 2: JP-A 2008-053052

SUMMARY OF INVENTION

Technical Problem

It is therefore an object of this invention to provide a fuel cell separator that has a good adhesion with gaskets and a good hydrophilicity.

Solution to Problem

The inventors have conducted extensive investigations in order to achieve this object. As a result, they have discovered that a fuel cell separator in which the arithmetic mean height Sa and the reduced peak height Spk on at least the surface of a sealing area and the surfaces at bottom (recessed) and top (raised) regions of grooves serving as gas flow channels are adjusted within given ranges has a good hydrophilicity and a good adhesion with gaskets. They have also found that such fuel cell separators can be efficiently manufactured by specific blast treatment. These findings ultimately led to the present invention.

Accordingly, the invention provides:
1. A fuel cell separator which is obtained by molding a composition containing carbonaceous powder and a resin and which has, on one or both sides thereof, a sealing area and grooves that serve as gas flow channels,
   wherein at least a surface of the sealing area and bottom and top regions of the grooves on one side of the separator have an arithmetic mean height Sa as defined in ISO 25178-2: 2012 of from 0.50 to 1.60 μm and a reduced peak height Spk of 1.50 μm or less.
2. The fuel cell separator of 1 above, wherein the arithmetic mean height Sa is from 0.50 to 1.60 μm and the reduced peak height Spk is 1.50 μm or less over all of one side of the separator having the sealing area and the grooves that serve as gas flow channels.
3. The fuel cell separator of 1 above, wherein the arithmetic mean height Sa is from 0.50 to 1.60 μm and the reduced peak height Spk is 1.50 μm or less over all of both sides of the separator.
4. The fuel cell separator of 1 above, wherein the resin is an epoxy resin and a phenolic resin.
5. The fuel cell separator of any of 1 to 4 above, wherein the arithmetic mean height Sa is from 0.50 to 1.50 μm and the reduced peak height Spk is 1.48 μm or less.
6. A method of manufacturing a fuel cell separator, which method includes a first surface roughening step that roughens a surface of a molded body obtained by molding a composition containing a carbonaceous powder and a resin and having on one or both sides thereof a sealing area and grooves that serve as gas flow channels, and a second surface roughening step that roughens a surface of the molded body treated in the first surface roughening step,
   wherein the first surface roughening step subjects a surface of at least the sealing area and top and bottom regions of the grooves on one side of the separator to air blast treatment, and
   the second surface roughening step subjects at least the regions treated in the first surface roughening step to wet blast treatment.
7. The method of manufacturing a fuel cell separator of 6 above, wherein the first surface roughening step subjects all of both sides of the molded body to air blasting.
8. The method of manufacturing a fuel cell separator of 6 or 7 above which further includes the step of hot press molding the composition containing a carbonaceous powder and a resin within a mold to form a molded body having on at least one side thereof grooves that serve as gas flow channels.

Advantageous Effects of Invention

In the fuel cell separator of the invention, because at least the surface of an area thereon for sealing with a sealing member such as a gasket and bottom and top regions of grooves thereon that serve as gas flow channels have an arithmetic mean height Sa and a reduced peak height Spk which are adjusted within given ranges, adhesion with sealing members such as gaskets is good, in addition to which the hydrophilicity is excellent.

DESCRIPTION OF EMBODIMENTS

The invention is described more fully below.

The fuel cell separator according to this invention is a fuel cell separator which is obtained by molding a composition containing carbonaceous powder and a resin and which has, on one or both sides thereof, a sealing area and grooves that serve as gas flow channels. It is characterized in that at least the surface of the sealing area and bottom and top regions of the grooves on one side of the separator have an arithmetic mean height Sa as defined in ISO 25178-2: 2012 of from 0.50 to 1.60 µm and a reduced peak height Spk of 1.50 µm or less.

In this invention, when the arithmetic mean height Sa and the reduced peak height Spk fall outside of the above ranges, the wetting tension of bottom and top regions of the grooves that serve as the gas flow channels is low, water that has formed readily aggregates within the flow channels and the ability to drain off the water worsens, along with which water blockage between the electrodes and the separator tends to arise. Also, adhesive failure between the separator and the gasket readily occurs, as a result of which seal delamination arises and gas leakage tends to occur.

To further increase the hydrophilicity of the fuel cell separator and its adhesion with a gasket, at least the surface of the sealing area and the bottom and top regions of the grooves preferably have an arithmetic mean height Sa of from 0.50 to 1.50 µm and a reduced peak height Spk of 1.48 µm or less, and more preferably have an arithmetic mean height Sa of from 0.55 to 1.50 µm and a reduced peak height Spk of 1.46 µm or less.

The lower limit of the reduced peak height Spk is not particularly limited. However, from the standpoint of the fuel cell separator hydrophilicity and adhesion with a gasket, this is preferably at least 0.5 µm, and more preferably at least 0.6 µm.

As described above, the fuel cell separator of the invention has, on one or both sides thereof, a sealing area and grooves which serve as gas flow channels. It suffices for the arithmetic mean height S and the reduced peak height Spk of the surface of at least the sealing area and the bottom and top regions of the grooves serving as gas flow channels on one side of the separator to be adjusted within the above ranges, although it is preferable for the arithmetic mean height Sa and the reduced peak height Spk over all of one side having the sealing area and the grooves serving as gas flow channels to be adjusted within the above ranges.

The fuel cell separator of the invention may have a sealing area and grooves serving as gas flow channels on both sides thereof, in which case it is preferable for the arithmetic mean height Sa and reduced peak height Spk of the surfaces of the sealing areas and the bottom and top regions of the grooves serving as gas flow channels to be adjusted on both sides of the separator.

Both in cases where the fuel cell separator of the invention has a sealing area and grooves that serve as gas flow channels on one side thereof and in cases where it has them on both sides thereof, it is more preferable for the arithmetic mean height Sa and the reduced peak height Spk over all of both sides to be adjusted within the above ranges.

The carbonaceous powder used in this invention may be suitably selected from among carbonaceous powders which have hitherto been used in fuel cell separators.

Specific examples include natural graphite, synthetic graphite obtained by firing needle coke, synthetic graphite obtained by firing vein coke, graphite obtained by grinding electrodes to powder, coal pitch, petroleum pitch, coke, activated carbon, glassy carbon, acetylene black and Ketjen black. These may be used singly, or two or more may be used in combination.

The mean particle diameter (d=50) of the carbonaceous powder is not particularly limited. However, to suitably retain voids between the carbonaceous particles and to further enlarge the contact surface area between carbonaceous particles and thereby increase the electrical conductivity (decrease the contact resistance), the mean particle diameter is preferably from 10 to 200 µm, more preferably from 25 to 140 µm, and even more preferably from 50 to 100 µm.

The resin used in this invention is not particularly limited. However, from the standpoint of the heat resistance, a resin having a melting point or glass transition point of at least 100° C. is preferred. This resin may be a thermoset resin or a thermoplastic resin, although a thermoset resin is preferred from the standpoint of heat resistance and creep resistance.

Illustrative examples of thermoset resins include phenolic resins such as resole-type phenolic resins and novolak-type phenolic resins; furan resins such as furfuyl alcohol resins, furfuyl alcohol furfural resins and furfuryl alcohol phenolic resins; polyimide resins; polycarbodiimide resins; polyacrylonitrile resins; pyrene-phenanthrene resins; polyvinyl chloride resins; epoxy resins; urea resins; diallyl phthalate resins; unsaturated polyester resins; melamine resins and xylene resins. Of these, from the standpoint of processability and the physical properties of the molded body, the thermoset resin is preferably an epoxy resin or a phenolic resin.

The thermoset resin may be of one type used alone or two or more types may be used in combination.

Illustrative examples of thermoplastic resins include polyethylene, polypropylene, polyphenylene sulfide, fluoropolymers, polybutylene terephthalate, liquid crystal polymers, polyetheretherketone, polycycloolefins, polyethersulfone and derivatives of these having a melting point of 100° C. or more; polycarbonate, polystyrene, polyphenylene oxide and derivatives of these having a glass transition temperature of 100° C. or more; and thermoplastic elastomers such as styrene-based thermoplastic elastomers, olefin-based thermoplastic elastomers, polyester-based thermoplastic elastomers, polyvinyl chloride-based thermoplastic elastomers and polyurethane-based thermoplastic elastomers. Of these, from the standpoint of cost, heat resistance and creep resistance, polypropylenes are preferred.

The above thermoplastic resins may be of one type used alone, or two or more types may be used in combination.

In this invention, when an epoxy resin is used as the resin, in addition to the base resin, a curing agent such as a phenolic resin and curing accelerator may also be used. By using these, curing begins with the ingredients in a compatibilized state, and so the cure rate rises and the uniformity of the physical properties of the molded body improves.

The epoxy resin is not particularly limited, so long as it is a resin having epoxy groups. Examples include o-cresol novolak-type epoxy resins, phenolic novolak-type epoxy resins, bisphenol A-type epoxy resins, bisphenol F-type epoxy resins, biphenyl-type epoxy resins, biphenyl aralkyl-type epoxy resins, triphenol-type epoxy resins, brominated epoxy resins, dicyclopentadiene-type epoxy resins and biphenyl novolak-type epoxy resins. These may each be used alone, or two or more may be used in combination. Of these, an o-cresol novolak-type epoxy resin alone, a biphenyl-type epoxy resin alone, and mixtures thereof are preferred.

To further increase the heat resistance of the resulting fuel cell separator, the epoxy resin has an epoxy equivalent weight that is preferably from 158 to 800 g/eq, more preferably from 185 to 450 g/eq, and even more preferably from 190 to 290 g % eq.

Phenolic resins also act as curing agents for epoxy resins. Specific examples include novolak-type phenolic resins, cresol-type phenolic resins, alkyl-modified phenolic resins, biphenyl aralkyl-type phenolic resins and trisphenolmethane-type phenolic resins. These may each be used alone, or two or more may be used in combination.

The phenolic resin has a hydroxyl equivalent weight which is not particularly limited. However, to further increase the heat resistance of the resulting separator, it is preferably from 95 to 240 g/eq, and more preferably from 103 to 115 g/eq.

The curing accelerator is not particularly limited, so long as it is one that accelerates the reaction between epoxy groups and the curing agent. Examples include triphenylphosphine, tetraphenylphosphine, diazabicycloundecene, dimethylbenzylamine, 2-methylimidazole, 2-methyl-4-imidazole, 2-phenylimidazole, 2-phenyl-4-methylimidazole, 2-undecylimidazole and 2-heptadecylimidazole. These may each be used singly, or two or more may be used in combination.

In addition to the above ingredients, optional ingredients such as an internal mold release agent may also be suitably included in the composition used in this invention.

The internal mold release agent includes, without particular limitation, various types of internal mold release agents hitherto used in the molding of separators. Specific examples include stearic acid wax, amide wax, montanic acid wax, carnauba wax and polyethylene wax. These may each be used singly, or two or more may be used in combination.

The total content of resin in the composition, although not particularly limited, is preferably from 10 to 50 parts by weight, and more preferably from 15 to 35 parts by weight, per 100 parts by weight of the carbonaceous powder.

In cases where the resin used is an epoxy resin, it is preferable to include, with respect to the epoxy resin, from 0.98 to 1.08 hydroxyl group equivalents of a phenolic resin as the curing agent.

When an internal mold release agent is used, it is included in an amount which, although not particularly limited, is preferably from 0.1 to 1.5 parts by weight, and more preferably from 0.3 to 1.0 part by weight, per 100 parts by weight of the carbonaceous powder.

In cases where the resin used is an epoxy resin, when a curing accelerator is additionally used, the amount thereof, although not particularly limited, is preferably from 0.5 to 1.2 parts by weight per 100 parts by weight of the mixture of epoxy resin and phenolic resin.

The composition used in the invention may be prepared by, for example, mixing the carbonaceous powder and the resin in any order and in the prescribed proportions. Examples of mixers that may be used at this time include planetary mixers, ribbon blenders. Loedige mixers, Henschel mixers, rocking mixers and Nauta mixers.

Also, in cases where a base resin and a curing agent are used as the resin, and also in cases where a curing accelerator and an internal mold release agent are additionally used, these may be added in any order.

The inventive fuel cell separator possessing the above-described surface properties has, for example, a good electrical conductivity characterized by a contact resistance of less than 6.0 mΩ·cm$^2$ and also has, for example, a good hydrophilicity characterized by a wetting tension of 55 mN/m or more. Another property of the inventive fuel cell separator is that it has an excellent adhesive strength with gasketing.

Fuel cells equipped with the inventive fuel cell separator having such properties are able to maintain a stable power generation efficiency over a long period of time.

A solid polymer fuel cell is generally composed of a stack of many unit cells, each of which is constructed of a solid polymer membrane disposed between a pair of electrodes that are in turn sandwiched between a pair of separators which form flow channels for the supply and removal of gases. The fuel cell separator of the invention may be used as some or all of the plurality of separators in the fuel cell.

The method of manufacturing the fuel cell separator of the invention is not particularly limited so long as a separator of the above-described surface properties can be obtained. However, it is preferable to manufacture the fuel cell separator by a method which includes a first surface roughening step that roughens a surface of a molded body obtained by molding a composition containing a carbonaceous powder and a resin and having on one or both sides thereof a sealing area and grooves that serve as gas flow channels, and a second surface roughening step that roughens a surface of the molded body treated in the first surface roughening step, wherein the first surface roughening step subjects at least a surface of the sealing area and top and bottom regions of the grooves on one side of the separator to air blast treatment, and the second surface roughening step subjects at least the regions treated in the first surface roughening step to wet blast treatment.

In the first surface roughening step, the abrasive grit used in air blast treatment has a mean particle diameter (d=50) of preferably from 5 to 100 μm, more preferably from 10 to 90 μm, and even more preferably from 13 to 80 μm.

The material making up the abrasive grit used in air blast treatment may be, for example, alumina, silicon carbide, zirconia, glass, nylon or stainless steel. These may each be used singly, or two or more may be used in combination. Of these, alumina is preferred.

The discharge pressure during air blast treatment varies according to, for example, the particle size of the abrasive grit, and therefore cannot be strictly specified. However, the discharge pressure is preferably from 0.1 to 1 MPa, and more preferably from 0.15 to 0.5 MPa.

The delivery speed during air blast treatment also cannot be strictly specified, but is preferably from 0.1 to 5 m/min. more preferably from 0.3 to 2 m/min, and even more preferably from 0.5 to 1.5 m/min.

In the second surface roughening step, the abrasive grit used in wet blasting has a mean particle diameter (d=50) of preferably from 3 to 30 μm, more preferably from 4 to 20 μm, and even more preferably from 5 to 12 μm.

The material making up the abrasive grit used in wet blasting may be, for example, alumina, silicon carbide, zirconia, glass, nylon or stainless steel. These may each be used singly, or two or more may be used in combination. Of these, alumina is preferred.

The discharge pressure during wet blast treatment varies according to, for example, the particle size of the abrasive grit, and therefore cannot be strictly specified. However, the discharge pressure is preferably from 0.1 to 1 MPa, and more preferably from 0.15 to 0.5 MPa.

The delivery speed during wet blasting also cannot be strictly specified, but is preferably from 0.1 to 5 m/min, more preferably from 0.3 to 2 m/min, and even more preferably from 0.5 to 1.5 m/min.

By carrying out blast treatment in the above order, the surface properties of the fuel cell separator can easily be adjusted within the ranges stipulated in this invention.

In addition, other treatment steps such as air blowing, washing or plasma treatment may be carried out after the first surface roughening step and before the second surface roughening step.

In both the first surface roughening treatment and the second surface roughening treatment in the manufacturing method of the invention, when only the surface of the sealing area and the bottom and top regions of the grooves are to be subjected to blast treatment, blasting may be carried out after masking areas other than these. However, to eliminate the trouble of masking, both in cases where the sealing area and the grooves that serve as gas flow channels are provided on only one side of the molded body and also in cases where these are provided on both sides of the molded body, it is preferable to carry out air blast treatment (first surface roughening step) over all of both sides of the molded body and also to carry out wet blast treatment over all of both sides of the molded body following the first surface roughening step.

The molded body used in the surface roughening steps is manufactured using the above-described composition containing a carbonaceous power and a resin. Any molding method may be used so long as the molded body obtained has a sealing area and grooves that serve as gas flow channels on one or both sides thereof. However, in this invention, it is preferable to carry out production by the step of hot press molding a composition containing a carbonaceous powder and a resin within a mold to form a molded body having on one or both sides thereof grooves that serve as gas flow channels. With regard to the sealing area, in the molded body obtained by this press molding step, the site where a sealing member such as a gasket is to be laminated may serve directly without modification as the sealing area, or the sealing member lamination site on the molded body may be prepared as a sealing area such as by additional surface treatment.

In this case, the mold used in the hot press molding step is exemplified by a mold for fuel cell separator production which is capable of forming grooves that serve as gas flow channels at the surface of the molded body on one or both sides thereof.

The hot press molding conditions are not particularly limited, although the mold temperature is typically between 80° C. and 200° C., the molding pressure is typically from 1.0 to 50 MPa, preferably from 5 to 40 MPa, and the molding time is typically from 10 seconds to 1 hour, preferably from 20 to 180 seconds.

After hot press molding, from about 1 minute to about 600 minutes of heating at between 150° C. and 200° C. may be carried out to accelerate hot curing.

EXAMPLES

Examples of the invention and Comparative Examples are given below by way of illustration, although the invention is not limited by these Examples. The characteristics in the Examples were measured by the following methods.

[1] Mean Particle Diameter
Measured with a particle size analyzer (Nikkiso Co., Ltd.).
[2] Measurement of Arithmetic Average Height Sa and Reduced Peak Height Spk
A laser microscope (LEXT OLS5000, from Olympus Corporation) was used to measure the arithmetic average height Sa and reduced peak height Spk, as defined in ISO 25178-2:2012, for the surfaces of the bottom (concave) and top (convex) regions of the gas flow channels in the fuel cell separator.
[3] Contact Resistance
(1) Carbon Paper+Separator Sample
Two sheets of the respective separator samples produced were placed together, one on top of the other, following which carbon papers (TGP-H060, produced by Toray Industries, Inc.) were placed above and below the two separator samples, and copper electrodes were subsequently placed above and below the resulting assembly of separator samples and carbon papers. A surface pressure of 1 MPa was applied vertically to the entire assembly and the voltage was measured by the four-point probe method.
(2) Carbon Paper:
Copper electrodes were placed above and below a sheet of carbon paper, following which a surface pressure of 1 MPa was applied vertically thereto and the voltage was measured by the four-point probe method.
(3) Method for Calculating Contact Resistance:
The voltage drop between the separator samples and carbon paper was determined from the respective voltages obtained in (1) and (2) above, and the contact resistance was computed as follows.

$$\text{Contact Resistance} = (\text{voltage drop} \times \text{surface area of contact}) / \text{current}$$

[4] Wetting Tension
The wetting tension was measured based on the plastic film and wetting tension test method in JIS K6768.
[5] Gas Leakage
The following procedure was used to measure gas leakage.
(1) A 1.5 MPa load was applied to a fuel cell separator with attached seal.
(2) 100 kPa of helium gas was introduced into the measurement system.
(3) The interior of the measurement system was then closed and left at rest for 60 seconds, following which the pressure drop was measured.

When the pressure drop over 60 seconds was 0.3 kPa or more, there was considered to be gas leakage.
[6] Seal Delamination
The presence or absence of delamination was visually evaluated after blowing 0.2 MPa or air for 2 seconds against a seal that was attached to the separator.
[7] Resin Residues
The presence or absence of resin residues on the separator surface was evaluated using a laser microscope (LEXT OLS5000, from Olympus Corporation).

Example 1

A composition for fuel cell separators was prepared by charging a Henschel mixer with 100 parts by weight of synthetic graphite powder (mean particle diameter: $d_{50}=35$ μm), 8.37 parts by weight of phenolic novolak epoxy resin (epoxy equivalent weight, 192 g/eq), 4.51 parts by weight of novolak phenolic resin (hydroxyl equivalent weight, 103 g/eq) and 0.12 part by weight of 2-phenylimidazole, then mixing these ingredients together for 3 minutes at 800 rpm.

The resulting composition was charged into a mold for producing fuel cell separators and compression molded at a mold temperature of 185° C. a molding pressure of 30 MPa and a molding time of 30 seconds, thereby giving a 240 mm×240 mm×2 mm plate-like molded body having gas flow channels on one side.

Next, using #800 (mean particle diameter, 14 μm) white alumina abrasive grit, the entire surface on both sides of the molded body was subjected to surface roughening by air blasting (first surface roughening treatment) at a nozzle pressure of 0.25 MPa and a delivery speed of 1 m/min.

In addition, using #2000 (mean particle diameter, 6 μm) white alumina abrasive grit, the entire surface on both sides of the molded body after air blast treatment was subjected to surface roughening by wet blasting (second surface roughening treatment) at a nozzle pressure of 0.25 MPa and a delivery speed of 1 m/min, thereby giving a fuel cell separator.

During first surface roughening treatment and second surface roughening treatment, the sealing and grooved areas were not masked.

Example 2

Aside from changing the size of the white alumina abrasive grit used in air blast treatment to #400 (mean particle diameter, 30 μm), a fuel cell separator was obtained in the same way as in Example 1.

Example 3

Aside from changing the size of the white alumina abrasive grit used in air blast treatment to #220 (mean particle diameter, 75 μm), a fuel cell separator was obtained in the same way as in Example 1.

Comparative Example 1

A plate-like molded body was obtained in the same way as in Example 1.

Using #2000 white alumina abrasive grit, the entire surface on both sides of the molded body thus obtained was subjected to surface roughening by wet blasting at a nozzle pressure of 0.25 MPa and a delivery speed of 1 n/min.

In addition, using #800 white alumina abrasive grit, the entire surface on both sides of the molded body after wet blast treatment was subjected to surface roughening by air blasting at a nozzle pressure of 0.25 MPa and a delivery speed of 1 m/min, thereby giving a fuel cell separator.

During surface treatment, the sealing and grooved areas were not masked.

Comparative Example 2

Aside from not carrying out surface roughening by wet blasting (second surface roughening treatment), a fuel cell separator was obtained in the same way as in Example 1.

Comparative Example 3

Aside from not carrying out surface roughening by wet blasting (second surface roughening treatment), a fuel cell separator was obtained in the same way as in Example 2.

Comparative Example 4

Aside from not carrying out surface roughening by wet blasting (second surface roughening treatment), a fuel cell separator was obtained in the same way as in Example 3.

Comparative Example 5

Aside from not carrying out surface roughening by air blasting (first surface roughening treatment), a fuel cell separator was obtained in the same way as in Example 1.

Comparative Example 6

Aside from changing the white alumina abrasive grit used in wet blast treatment to #1200 (mean particle diameter, 9 μm), a fuel cell separator was obtained in the same way as in Comparative Example 5.

The arithmetic mean height Sa and reduced peak height Spk on the surface and the contact resistance, wetting tension, gas leakage, resin residues and seal delamination were measured or evaluated for each of the fuel cell separators obtained in Examples 1 to 3 and Comparative Examples 1 to 6. The results are shown in Table 1.

TABLE 1

| | Example | | | Comparative Example | | | | | |
|---|---|---|---|---|---|---|---|---|---|
| | 1 | 2 | 3 | 1 | 2 | 3 | 4 | 5 | 6 |
| Air blasting | ○ | ○ | ○ | ○ | ○ | ○ | ○ | | |
| Wet blasting | ○ | ○ | ○ | ○ | | | | ○ | ○ |
| Sa (μm) | 0.55 | 0.86 | 1.49 | 0.82 | 0.71 | 1.25 | 1.62 | 0.33 | 0.46 |
| Spk (μm) | 0.62 | 1.01 | 1.46 | 1.52 | 1.52 | 1.68 | 1.93 | 0.31 | 0.42 |
| Resin residues | no | no | no | no | no | no | no | yes | no |
| Gas leakage | no | no | no | no | no | no | yes | no | no |
| Contact resistance (mΩ·m²) | 5.9 | 5.8 | 5.7 | 5.8 | 6.0 | 5.6 | 5.3 | 8.6 | 5.2 |
| Wetting tension (mN/m) | 56 | 60 | 62 | 42 | 38 | 42 | 46 | 48 | 60 |
| Seal delamination | no | no | no | no | yes | no | no | yes | yes |

As shown in Table 1, it is apparent that the fuel cell separators of Examples 1 to 3 in which at least the surface of the sealing area and bottom and top regions of the grooves have an arithmetic mean height Sa of from 0.50 to 1.60 μm and a reduced peak height Spk of 1.50 μm or less are free of gas leakage and gasket delamination, and have a good hydrophilicity.

It is also apparent that fuel cell separators with these surface properties can be easily manufactured by subjecting at least the surface of the sealing area and bottom and top regions of the grooves serving as gas flow channels on the separator to surface roughening treatment by air blasting (first surface roughening treatment) and to surface roughening treatment by wet blasting (second surface roughening treatment) in this order.

The invention claimed is:

1. A fuel cell separator which is obtained by molding a composition containing carbonaceous powder and a resin and which comprises, on one or both sides thereof, a sealing area and grooves that serve as gas flow channels,
- wherein at least a surface of the sealing area and bottom and top regions of the grooves on one side of the separator have an arithmetic mean height Sa as defined in ISO 25178-2: 2012 of from 0.50 to 1.60 μm and a reduced peak height Spk of 1.50 μm or less.

2. The fuel cell separator of claim 1, wherein the arithmetic mean height Sa is from 0.50 to 1.60 μm and the reduced peak height Spk is 1.50 μm or less over all of one side of the separator having the sealing area and the grooves that serve as gas flow channels.

3. The fuel cell separator of claim 1, wherein the arithmetic mean height Sa is from 0.50 to 1.60 μm and the reduced peak height Spk is 1.50 μm or less over all of both sides of the separator.

4. The fuel cell separator of claim 1, wherein the resin is an epoxy resin and a phenolic resin.

5. The fuel cell separator of claim 1, wherein the arithmetic mean height Sa is from 0.50 to 1.50 μm and the reduced peak height Spk is 1.48 μm or less.

* * * * *